(12) United States Patent  
Sander

(10) Patent No.: US 7,227,919 B2
(45) Date of Patent: Jun. 5, 2007

(54) DATA SAMPLER FOR DIGITAL FREQUENCY/PHASE DETERMINATION

(75) Inventor: Brian Sander, San Jose, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/400,449

(22) Filed: Apr. 6, 2006

(65) Prior Publication Data

US 2006/0182213 A1    Aug. 17, 2006

Related U.S. Application Data

(63) Continuation of application No. 09/852,818, filed on May 9, 2001, now Pat. No. 7,027,545.

(51) Int. Cl.
*H04L 7/00*    (2006.01)
*H04L 25/40*   (2006.01)
*G01R 23/02*   (2006.01)

(52) U.S. Cl. ............... 375/355; 375/371; 327/2; 327/9; 327/39; 327/44

(58) Field of Classification Search .......... 375/354, 375/355, 362, 371, 373, 375, 376; 327/1, 327/2, 7, 9, 12, 39, 40, 42, 43, 44, 45, 47
See application file for complete search history.

(56) References Cited

U.S. PATENT DOCUMENTS

| 5,084,669 | A | 1/1992 | Dent |
| 5,272,391 | A | 12/1993 | Ampe et al. |
| 5,452,331 | A | 9/1995 | Shihabi et al. |
| 5,463,655 | A | 10/1995 | Llewellyn |
| 5,488,639 | A | 1/1996 | MacWilliams et al. |
| 5,528,637 | A | 6/1996 | Sevenhans et al. |
| 5,761,254 | A | 6/1998 | Behrin |
| 5,892,384 | A | 4/1999 | Yamada et al. |
| 6,219,394 | B1 | 4/2001 | Sander |
| 6,326,826 | B1 | 12/2001 | Lee et al. |
| 6,606,004 | B2 | 8/2003 | Staszewski et al. |

FOREIGN PATENT DOCUMENTS

WO    WO 99/18691    4/1999

OTHER PUBLICATIONS

International Search Report, Publication No. WO 03/023951 A3, International Application No. PCT/US02/14053, publication date Mar. 20, 2003.
Written Opinion, International Application No. PCT/US02/14053, date mailed Jan. 28, 2005.

*Primary Examiner*—Betsy L. Deppe
(74) *Attorney, Agent, or Firm*—McDermott Will & Emery LLP

(57) ABSTRACT

A digital circuit and method for forming number streams for frequency and/or phase comparison of digital or digitized signals, referred to herein as clock signals, where typically one of the clock signals is a known clock signal and another of the clock signal is an unknown clock signal. The unknown clock signal may be derived, for example, from a communications signal. The rate of the unknown clock signal may exceed the rate of the known clock signal. In an exemplary embodiment, an "alias" value (e.g., an integer 1, 2, 3, etc.) is applied to the circuit as an indication of the expected frequency range of the unknown clock signal. The number stream is formed accordingly.

1 Claim, 5 Drawing Sheets

DATA SAMPLER FOR DIGITAL FREQUENCY/PHASE DETERMINATION

CROSS-REFERENCE TO RELATED APPLICATIONS

This is a continuation application of application Ser. No. 09/852,818, filed on May 9, 2001 and issued as U.S. Pat. No. 7,027,545 on Apr. 11, 2006.

BACKGROUND

1. Field of the Invention

The present invention relates to circuits for sampling a digital (digitized) signal.

2. Description of Related Art

Patent publication WO 9918691 of the present assignee (corresponding to allowed U.S. application Ser. No. 09/006,938 entitled DIGITAL PHASE DISCRIMINATION BASED ON FREQUENCY SAMPLING, filed 14 Jan. 1998, incorporated herein by reference) describes a digital circuit for forming number streams for representing frequency and/or phase of digital or digitized signals, referred to herein as clock signals, where typically one of the clock signals is a known clock signal and another of the clock signal is an unknown clock signal. The unknown clock signal may be derived from a communications signal, for example. Referring to FIG. 1, In the illustrated embodiment, it is assumed that the ratio of the clock signals is such that no more than one rising edge of the faster clock will occur during a single period of the slower clock. In other embodiments, this assumption need not apply.

The capture circuit includes an input portion 101 and an output portion 103. The input portion includes two sections Ch1 and Ch2 that must be carefully matched to minimize errors. Each section comprises a chain of two or more D flip-flops coupled in series. In the following description, the same reference numerals will be used to reference the respective flip-flops themselves and their respective output signals.

Within each section, the first flip-flop in the chain is clocked by a sampled clock signal Fx. The succeeding flip-flops in the chain are clocked by a sampling clock signal Fs. The D input of the first flip-flop Q1 in the upper section is coupled to the Qb output of the same. The D input of the first flip-flop in the lower section is coupled to the Q output of the first flip-flop in the upper section. The remaining flip-flops in both sections are coupled in series—i.e., Q to D, Q to D.

The function of the input portion is to 1) produce two signals, logical inverses of one another, that transition on rising edges of the clock signal Fx; 2) to latch the values of the two signals on the rising edge of the clock signal Fs; and 3) to detect transitions from one clock to the next. The intermediate stages Q3 and Q4 may be required to minimize metastability resulting from the asynchrony of the two clock signals, and in fact multiple such stages may be desirable in a particular design.

The output portions includes, in an exemplary embodiment, three two-input NAND gates. Respective NAND gates N1 and N2 are coupled to the D and Q signal of the final flip-flop stages of the input sections. Output signals of the NAND gates N1 and N2 are combined in the further NAND gate N3 to form the final output of the capture circuit.

The function of the output portion is to detect a change in the input clock signal level from one sample clock to the next in either of two channels formed by the two input sections. The two input sections function in a ping-pong fashion, alternately detecting changes in the input clock signal level.

Operation of the capture circuit of FIG. 1 may be more fully appreciated with reference to the timing diagram of FIG. 2. The first stages of the two channels form inverse signals Q1 and Q2 approximately coincident with (but slightly delayed from) rising edges of the input clock signal. The signals Q3 and Q4 are formed by sampling the signals Q1 and Q2, respectively, in accordance with the sample clock. The signals Q5 and Q6, respectively, are delayed replicas of the signals Q3 and Q4. The NAND gates together realize the logic function X=Q3.Q5v Q4.Q6.

In the example of FIG. 2, the illustrated signals are all idealized squarewave signals. In actuality, the signals will have finite rise and fall times. The possible effect of the finite rise and fall times of the signals Q1 and Q2 and the asynchrony of the circuit is metastability, as illustrated in FIG. 3. Here, the signals Q3 and Q5 and the signals Q4 and Q6 are each in an indeterminate state for one cycle. The resulting output of the circuit may or may not be correct. However, because the decision was a "close call" to begin with, the effect of an occasional erroneous decision on the overall operation of the circuit is negligible. The time window of instability is reduced by increasing the overall gain in the path. If the gain in Q3 and Q4 is sufficient to reduce the probability of an error to an acceptable level, then no additional circuitry is required. If not, then additional circuitry will be required to increase the gain.

In some applications, it is desirable that rate of the unknown clock signal be allowed to exceed the rate of the known clock signal. The foregoing circuit does not satisfy this requirement.

SUMMARY OF THE INVENTION

The present invention, generally speaking, provides a digital circuit and method for forming number streams for frequency and/or phase comparison of digital or digitized signals, referred to herein as clock signals, where typically one of the clock signals is a known clock signal and another of the clock signal is an unknown clock signal. The unknown clock signal may be derived from a communications signal, for example. The rate of the unknown clock signal may exceed the rate of the known clock signal. In an exemplary embodiment, an "alias" value (e.g., an integer 1, 2, 3, etc.) is applied to the circuit as an indication of the expected frequency range of the unknown clock signal. The number stream is formed accordingly.

BRIEF DESCRIPTION OF THE DRAWING FIGURES

The present invention may be further understood from the following description in conjunction with the appended drawing figures. In the figures.

DETAILED DESCRIPTION OF THE PREFERRED EMBODIMENTS

Figure 1:
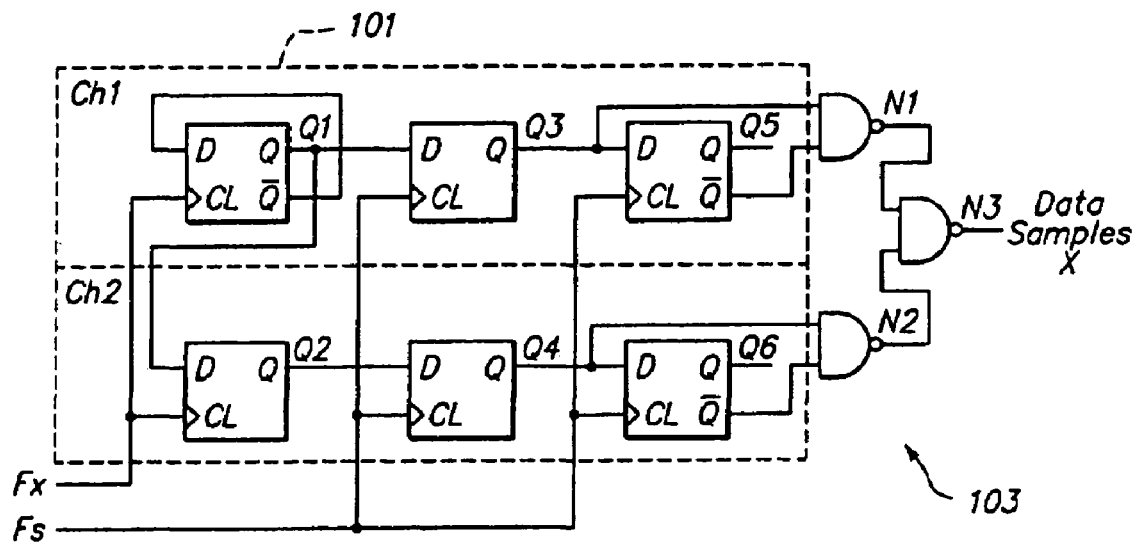
FIG. 1 is a diagram of a known capture circuit.
Figure 2:
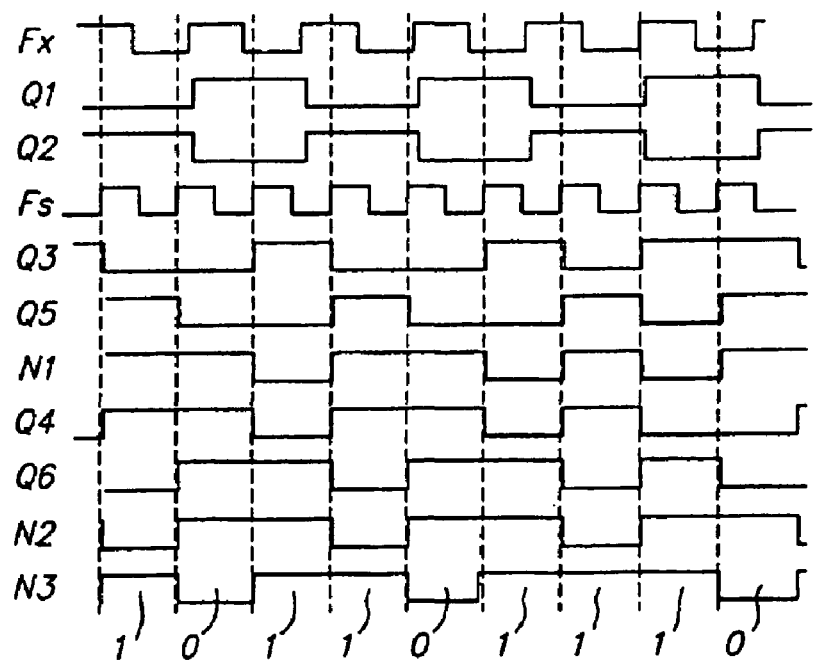
FIG. 2 is a waveform diagram illustrating operation of the circuit of FIG. 1.
Figure 3:
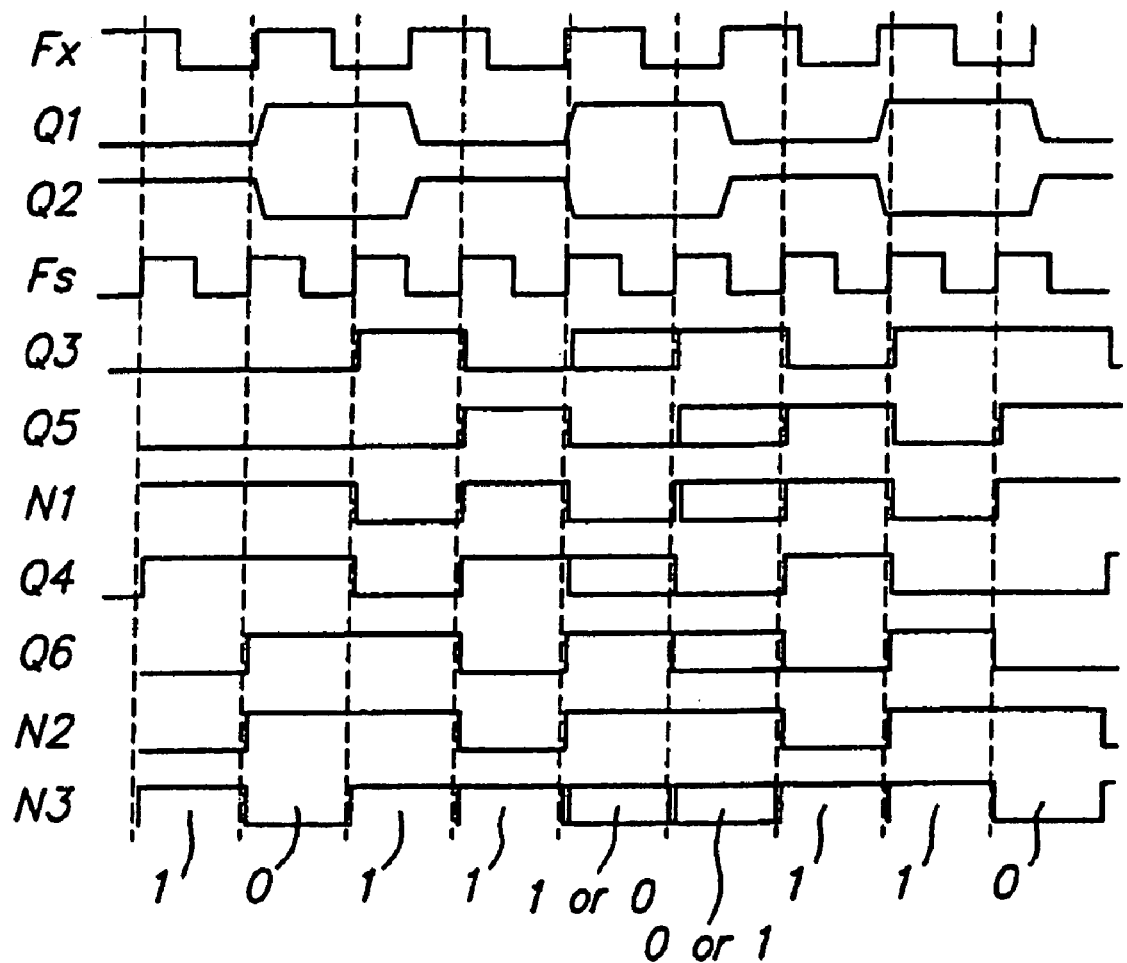
FIG. 3 is a further waveform diagram illustrating operation of the circuit of FIG. 1.
Figure 4:
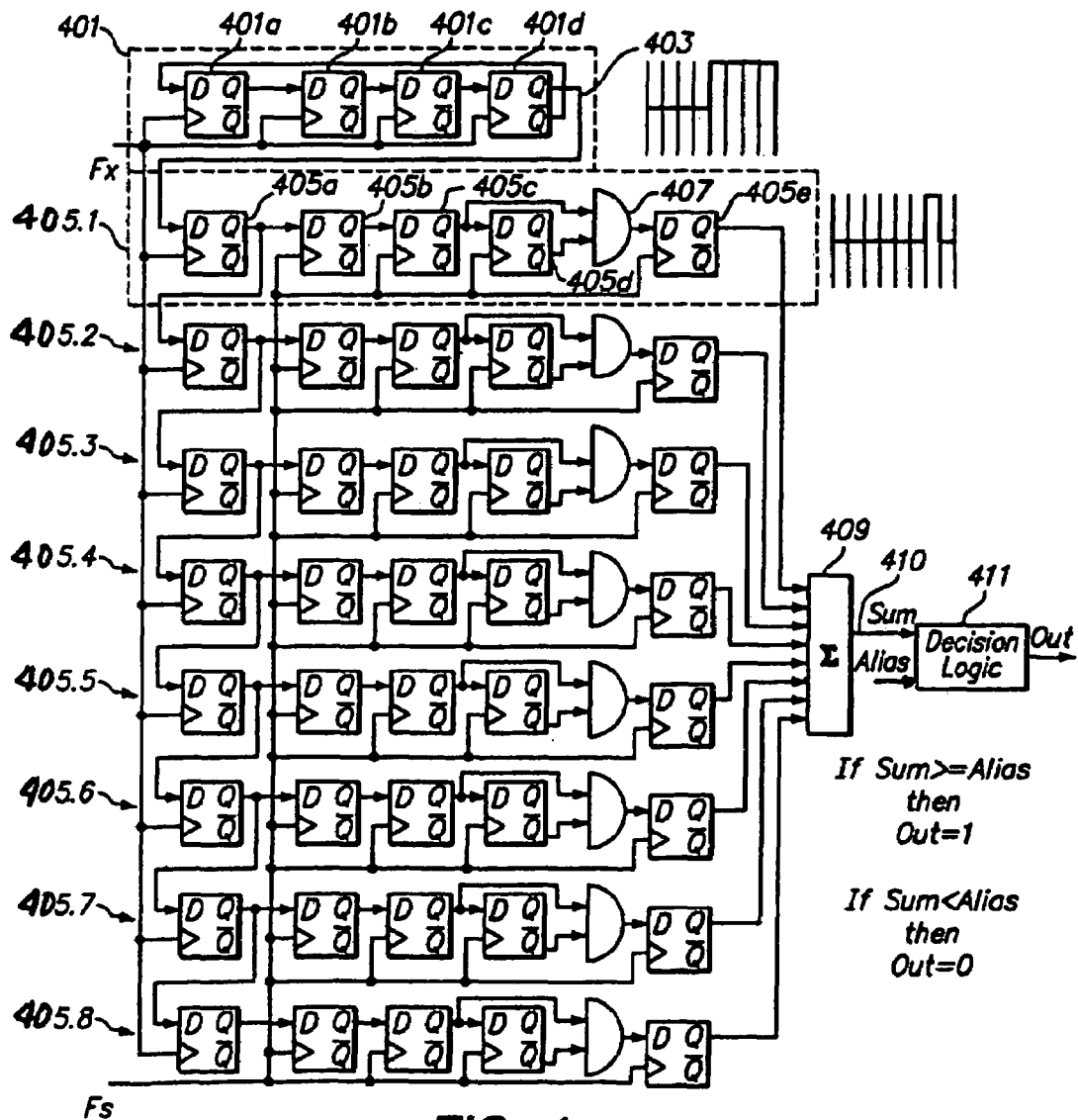
FIG. 4 is a diagram of one embodiment of a capture circuit having as an input thereof an alias value.

Referring now to FIG. 4, a diagram is shown of one embodiment of a capture circuit having as an input thereof an alias value, as described below.

In the illustrated embodiment, an input section 401 includes four flip flops (e. g., D flip flops) clocked by the unknown clock signal Fx. The flip flops are coupled in series, Q output to D input, so as to form a ring except that, in the case of the final flip flop 401d, the Qb output (instead of the Q output) is coupled to the D input of the first flip flop 401a. The input section 401 produces a derived clock signal 403 of 50% duty cycle having a period eight times that of the unknown clock signal, as illustrated.

A main portion of the circuit consists of multiple identical logic chains 405.1–405.8 The logic chain 405.1 will be described for purposes of illustration.

The logic chain 405.1 includes a first flip flop 405a clocked by the unknown clock signal and a series of flip flops 405b–405d clocked by the known clock signal. The flip flops 405a–405d are coupled in series, Q output to D input. The flip flop 405d is coupled to a logic gate 407 (i.e., an AND gate) that functions as a positive edge transition detector. In particular, inputs of the logic gate are coupled to the D input and the Qb output of the flip flop 405d. Hence, when the present value stored in the flip flop 405d is a zero and the next value is a one, the logic gate produces a logic high signal, and when the present value stored in the flip flop 405d is the same as the value to be stored next in the flip flop 405d, the logic gate produces a logic low signal. The logic gate 407 is followed by a further flip flop 405e, also clocked by the known clock signal, that stores the state of the output signal of the logic gate for one clock period.

Note that, although all of the logic chains 405 have the same arrangement, for each succeeding logic chain 405, its input signal is the output signal of the first flip flop 405a of the preceding logic chain.

Output signals of all of the flip flops 405e are input to a summation element 409 (e.g., an adder) that sums the number of ones among the output signals and outputs a resulting Sum value 410 to a decision logic block 411. The decision logic block 411 receives an "Alias" value and compares the Sum value 410 to the Alias value. If the Sum equals or exceeds the Alias, then the decision logic block outputs a logic 1. Otherwise, the decision logic block outputs a logic 0.

Figure 5:
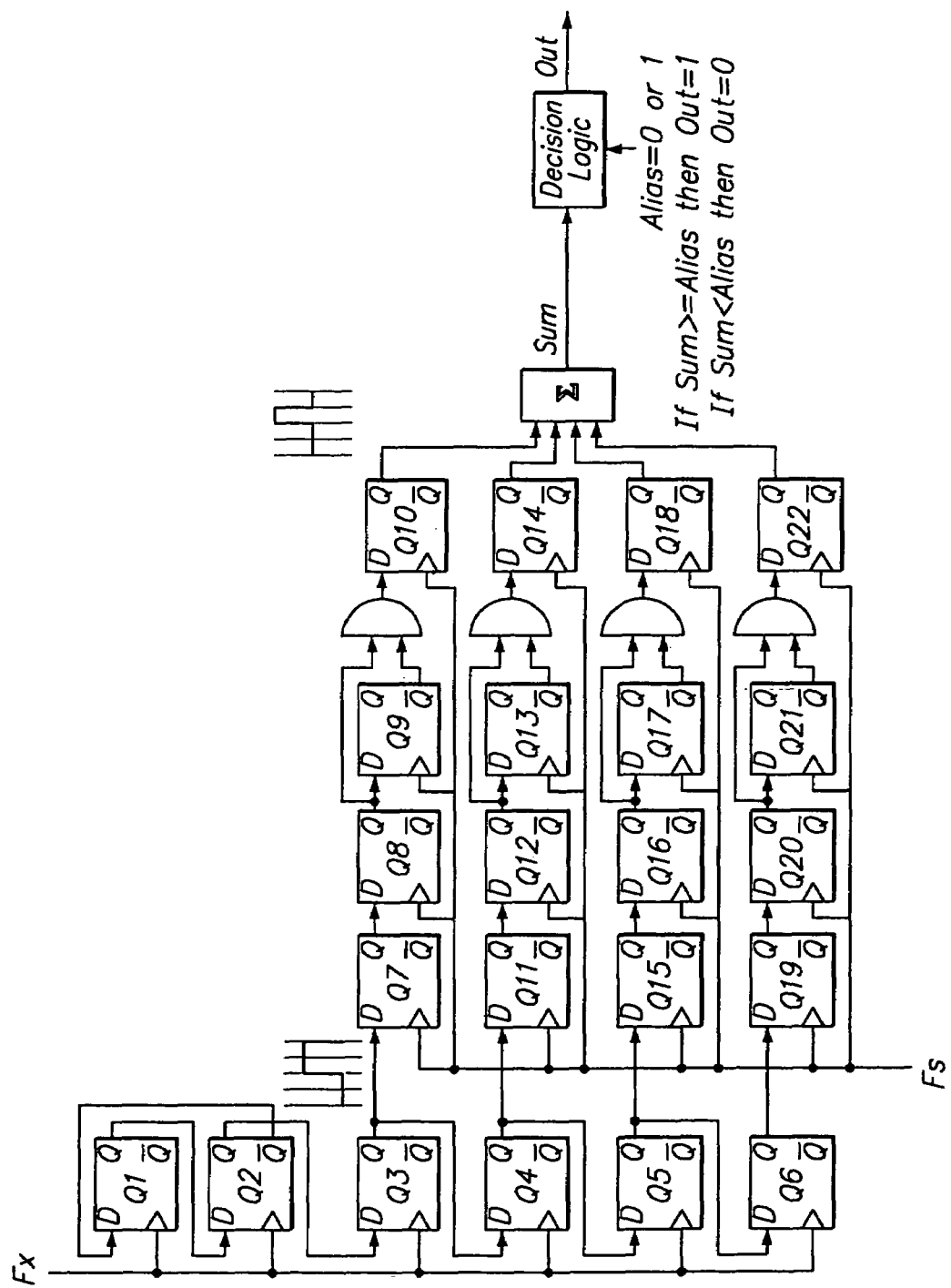
FIG. 5 is a diagram of a variant of the capture circuit of FIG. 4.

A variant of the capture circuit having a fewer number of logic chains than in FIG. 4 is shown in FIG. 5. The principles of operation of the two capture circuits are the same. Of course, a capture circuit having a greater number of logic chains than in FIG. 4 could also be used. However, for simplicity of description, the remaining description will focus on operation of the capture circuit of FIG. 5.

In operation, the input section (Q1–Q6) produces a sequence of delayed versions of the derived clock signal at the Q outputs of flip flops Q3–Q6. These versions (forming a set of delayed clock signals) are delayed relative to one another by one period of the unknown clock signal. The Sum value is essentially a measure of the number of transitions of the set of delayed clock signals occurring within a given period of the known clock signal. If the unknown clock signal were swept from low frequency to high frequency, the following results would be observed. From DC to one times the known clock signal frequency ("first octave"), the Sum value would be zero, sometimes one, more often one, and then mostly one, as the frequency of the unknown clock signal approached that of the known clock signal. Within the second octave, the Sum value would be one, sometimes two, more often two, and then mostly two as the frequency of the unknown clock signal approached that of the known clock signal, etc. The Alias value may therefore be regarded as an octave selection value and is set in accordance with the octave expected to be occupied by the unknown clock signal.

In the particular case of the circuit of FIG. 5, the number of transitions that can be accomodated is 0, 1, or 2. Normally, the sum will be a series of 0's or 1's (Fx<Fs) or a series of 1's and 2's (Fx>Fs). The Alias input is set to 0 in the former case or to 1 in the latter case. The decision logic masks some illegal responses to prevent "folding" and standardizes the Out response to 0's and 1's. (Meta-stability is not a major problem, since when a decision is borderline, it does not matter, except perhaps from a noise perspective, which choice is made.)

Figure 6:
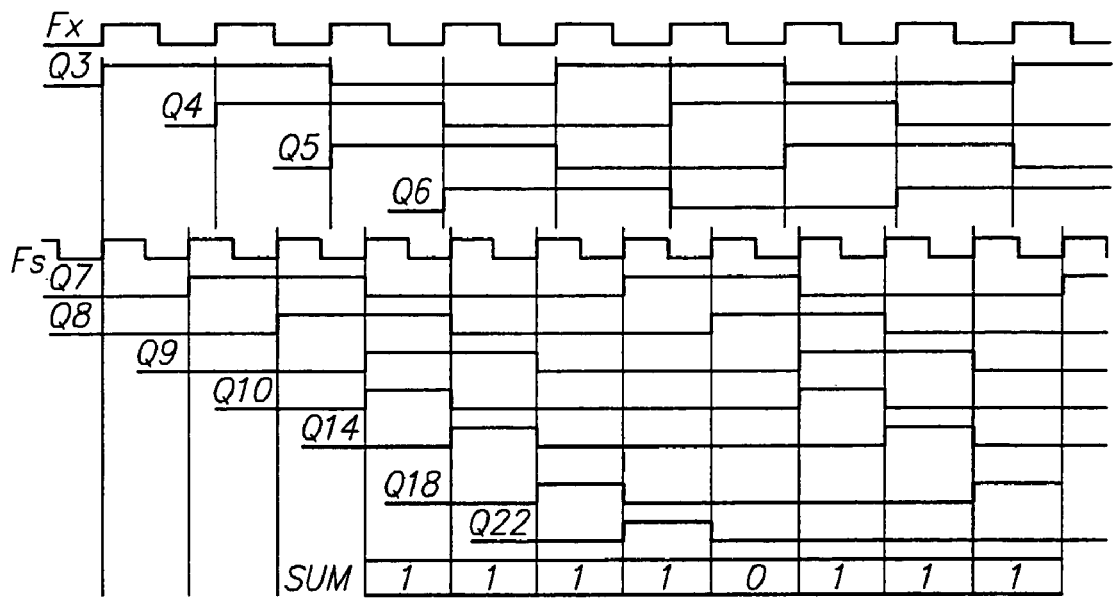
FIG. 6 is a waveform diagram illustrating operation of the circuit of FIG. 5 under one set of conditions.
Figure 7:
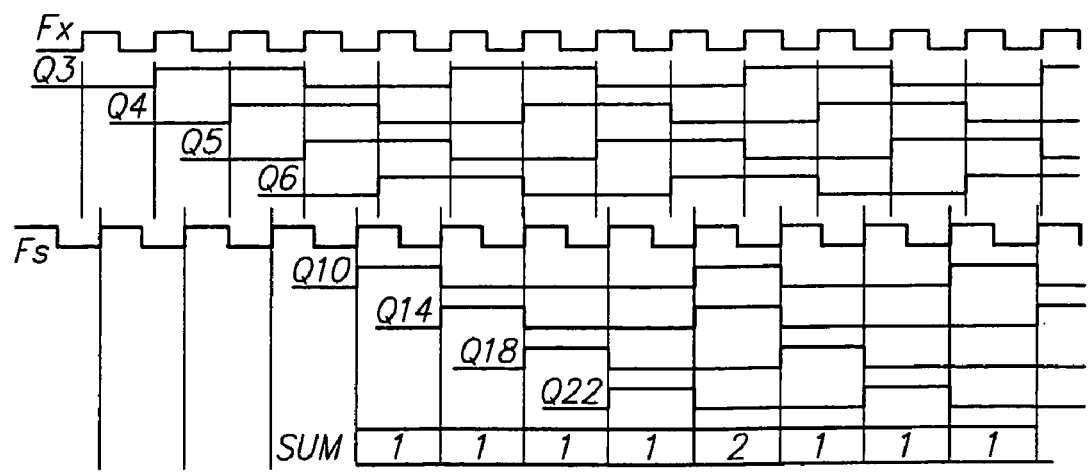
FIG. 7 is a waveform diagram illustrating operation of the circuit of FIG. 5 under another set of conditions.

The manner of operation may be more clearly seen from the waveform diagrams of FIG. 6 and FIG. 7.

FIG. 6 is a timing diagram for the case where Fx<Fs. Flip-flops Q1 and Q2 (FIG. 5) form a divide by 4 version of Fx. The divided signal is then shifted by Q3, Q4, Q5 and Q6 at clock rate Fx to form a multiphase divided set of signals as shown in FIG. 6. The multiphase divided signals are then captured at clock rate Fs into Q7, Q11, Q15, and Q19. The next bank of flip-flops Q8, Q12, Q16, AND Q20 of FIG. 5 are used to minimize metastability. The subsequent flip-flop pairs such as Q9 and Q10 form a signal that is true for one clock (Fs) cycle whenever Q8 changes from 0 to 1 as seen in FIG. 6. The Sum is formed as the sum of the output signals of Q10, Q 14, Q 18, and Q22.

FIG. 7 shows the behavior when Fx is greater than Fs so that the Sum values are 1's and 2's.

Thus, there has been described a digital circuit and method for forming number streams representing frequency and/or phase of digital or digitized signals, where typically one of the clock signals is a known clock signal and another of the clock signal is an unknown clock signal (e.g., derived from a communications signal). The rate of the unknown clock signal may exceed the rate of the known clock signal. By applying an "alias" value (e.g., an integer 1, 2, 3, etc.) to the circuit as an indication of the expected frequency range of the unknown clock signal, the number stream may be formed accordingly.

It will be apparent to those of ordinary skill in the art that the present invention can be embodied in other specific forms without departing from the spirit or essential character thereof. The described embodiments are therefore intended to be in all respects illustrative and not restrictive. The scope of the invention is indicated by the appended claims, rather than the foregoing description, and all changes which come within the meaning and range of equivalents thereof are intended to be embraced therein.

What is claimed:

1. A circuit for comparing an unknown first clock signal and a known second clock signal, the circuit comprising:
   an input section, clocked by the unknown first clock signal, that produces a slower first clock signal;
   a plurality of logic chains, wherein a first logic chain of said plurality of logic chains comprises:
      a first logic unit clocked by the unknown first clock signal and storing the slower first clock signal;
      two or more logic units, coupled to the first logic unit, that are clocked by the known second clock signal;
      an edge detector, coupled to the last of the two or more logic units and the second to last of the two or more logic units, that detects an edge transition;
   wherein each of the plurality of logic chains, other than said first logic chain, comprises:
      a first logic unit clocked by the unknown first clock signal and storing an output signal from the first logic unit of the preceding logic chain;
      two or more logic units, coupled to the first logic unit, that are clocked by the known second clock signal; and
      an edge detector, coupled to the last of the two or more logic units and the second to last of the two or more logic units, that detects an edge transition;
   an alias-detection circuit, coupled to the edge detectors, that determines a logic to be output in accordance with an alias value and the known second clock.

* * * * *